United States Patent [19]
Wagner

[11] 4,047,575
[45] Sept. 13, 1977

[54] FOLDUP IMPLEMENT WITH LIFT ARRANGEMENT FOR WING THEREOF

[75] Inventor: Robert L. Wagner, La Porte, Ind.

[73] Assignee: Allis-Chalmers Corporation, Milwaukee, Wis.

[21] Appl. No.: 647,608

[22] Filed: Jan. 8, 1976

[51] Int. Cl.² .................. A01B 73/00; A01B 63/22
[52] U.S. Cl. .................. 172/311; 172/414; 172/456; 172/501; 172/583; 172/640; 172/666
[58] Field of Search .............. 172/311, 316, 414, 456, 172/459, 491, 501, 502, 580, 583, 640, 662, 666; 280/411 R, 411 A, 412, 413; 254/86 H, 124; 56/6, 7

[56] References Cited
U.S. PATENT DOCUMENTS

| | | | |
|---|---|---|---|
| 3,517,749 | 6/1970 | Callahan | 172/501 X |
| 3,650,333 | 3/1972 | Fueslein | 172/311 |
| 3,731,747 | 5/1973 | Frank | 172/311 |
| 3,814,191 | 6/1974 | Tilbury | 172/311 |
| 3,828,860 | 8/1974 | Poland | 172/311 |
| 3,944,001 | 3/1976 | Warner et al. | 172/311 |
| 3,948,327 | 4/1976 | Parker et al. | 172/311 |

FOREIGN PATENT DOCUMENTS

747,719  4/1956  United Kingdom ............... 254/124

*Primary Examiner*—Richard T. Stouffer
*Attorney, Agent, or Firm*—Charles L. Schwab

[57] ABSTRACT

Power operated mechanisms are provided to operate a foldup implement which includes a double-acting hydraulic jack interconnected between a foldup wing section and a main section. The jack has a lost motion connection with the main section permitting the wing section to float up and down about its longitudinal pivot connection to the main section during field operations. An elongated slot of the lost motion connection is so disposed as to minimize any tendency for the end of the jack associated with the slot to move from its position at the laterally outer end of the slot as the wing section is raised to its transport position. To further insure that the end of the jack will not shift from its position at the laterally outer end of the slot as the wing section is raised to a transport position, an abutment member is disposed above a part of the slot so as to abut the end of the jack in the slot should the latter tend to shift laterally inwardly while the wing section is in its raised transport position.

13 Claims, 6 Drawing Figures

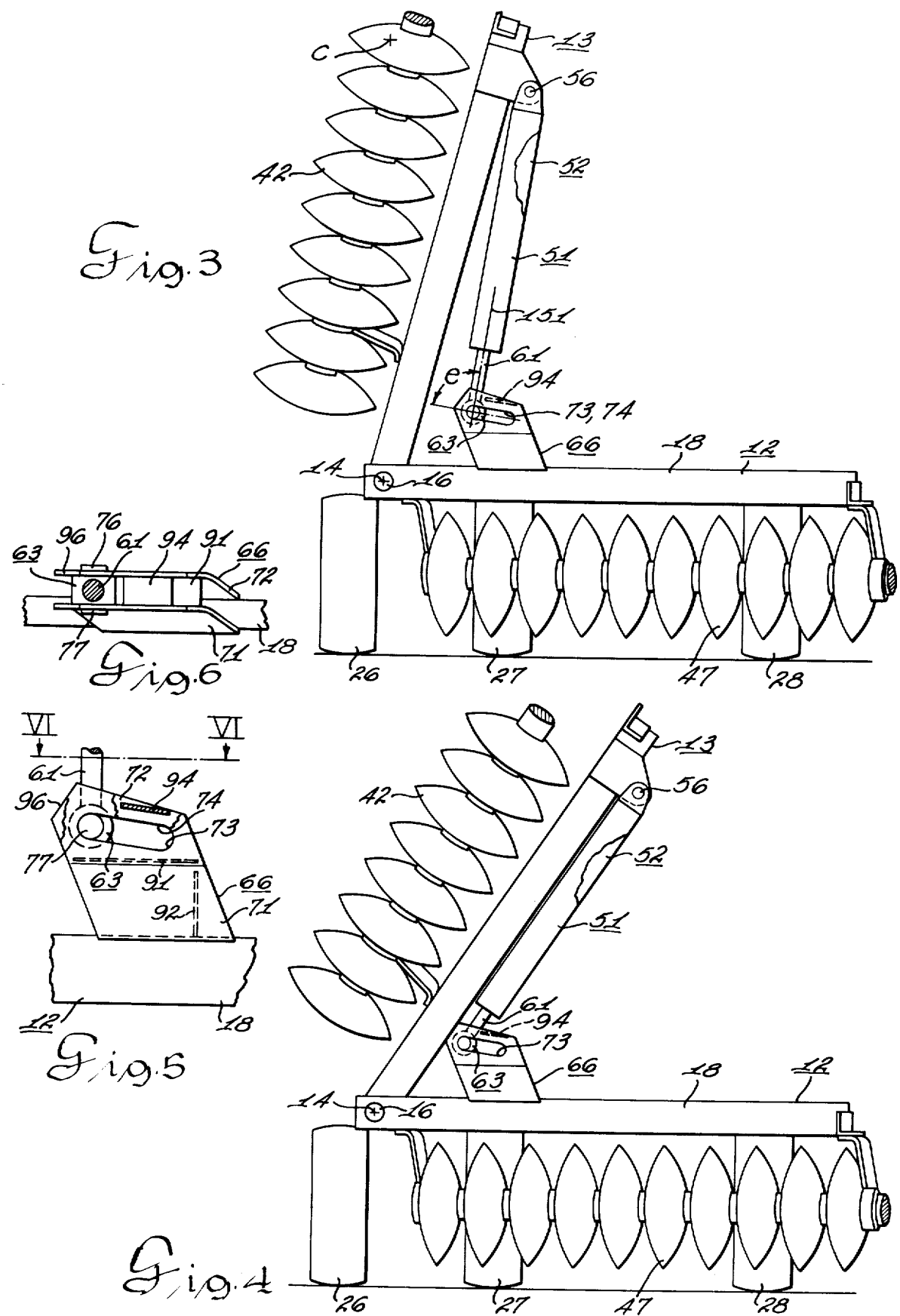

FOLDUP IMPLEMENT WITH LIFT ARRANGEMENT FOR WING THEREOF

BACKGROUND OF THE INVENTION

U.S. Pat. Nos. 3,692,121; 3,814,191 and 3,828,869 show foldup implements with wing section folding mechanisms allowing floating of the wing section in its operating position. These prior art implements use various complex linkages and pivot arrangements. Some prior art foldup arrangements require insertion or removal of pins for safe transport or for achieving the floating function. Such arrangements require the operator to leave the tractor operator station at the time the implement is folded up for transport or unfolded for field operation, thus consuming valuable operating time. In operating with the prior art devices, failure to remove or insert pins could result in damage to the equipment or give rise to a safety problem. The prior art devices are expensive to manufacture, costly to the customer and require an excessive amount of operator attention.

BRIEF DESCRIPTION OF THE INVENTION

The wing section of a foldup implement is pivotally connected to a main section on a longitudinal pivot axis for swinging movement between a side-by-side working position to an overhead folded transport position. The means for swinging the wing section from its working position to a foldup transport position includes a double-acting hydraulic jack pivotally interconnected between the wing section and the main section. The connection between the hydraulic jack and the main section includes a laterally extending lost motion slot on the main section which is cooperatively engaged by a pivot part on one end of the jack. The geometry of this slot is such as to permit the wing section to float a predetermined number of degrees up and down without the jack being extended or contracted. During raising of the wing section, the pivot part of the jack will stay in the end of the slot nearest the wing section as the wing section is folded to its transport position. Additional structural means are provided to insure that the pivot part of the jack associated with the slot does not move from the end thereof adjacent the wing section as the wing section is folded to the transport position.

BRIEF DESCRIPTION OF THE DRAWINGS

FIG. 3 is a rear end view of the disc harrow shown in FIGS. 1 and 2 showing a wing section being pivoted to a transport position;

FIG. 4 is a view similar to FIG. 3 but showing the wing section in its transport position;

FIG. 5 is a rear view of one of the pivot structures on the main section of the disc harrow; and FIG. 6 is a section view taken along the line VI-VI in FIG. 5.

DETAILED DESCRIPTION OF THE INVENTION

Figure 1:
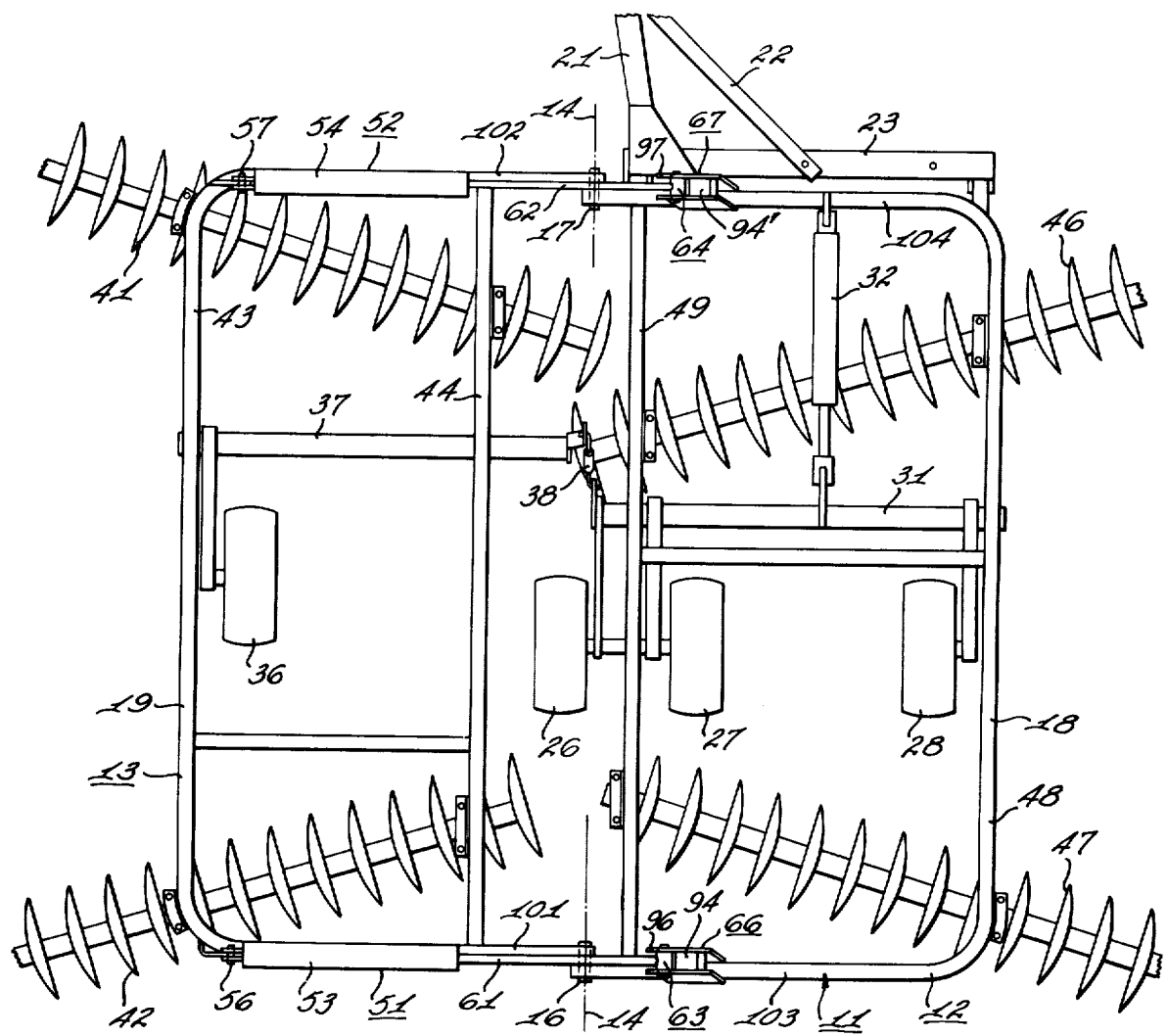
FIG. 1 is a top view of a disc harrow incorporating the present invention.
Figure 2:
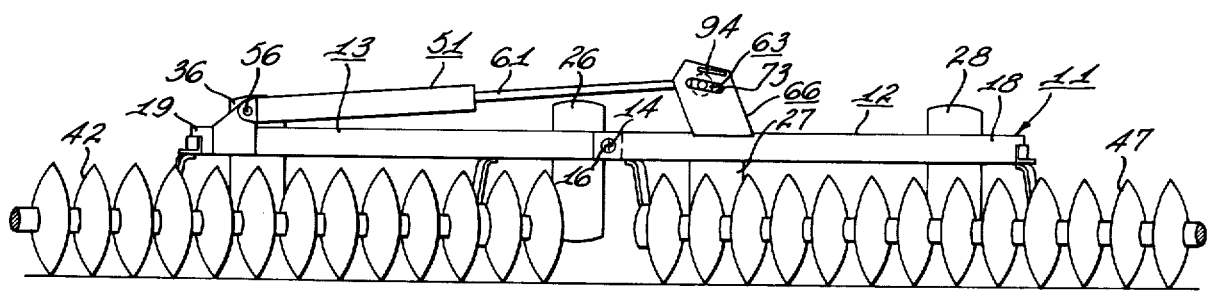
FIG. 2 is a rear end view of the disc harrow shown in FIG. 1.

Referring to FIGS. 1 and 2, a farm implement in the form of a foldup disc harrow 11 includes a main section 12 and a foldup section 13 which are pivotally interconnected on a longitudinal pivot axis 14 by a pair of pins 16, 17 interconnecting the adjacent ends of laterally extending legs 101, 102, 103, 104 of generally U-shaped frames 18, 19 of the sections 12 and 13. A suitable tongue 21 is connected to the frame 18 of the main section 12 and its position is adjustably fixed by a diagnonal brace 22 interposed between the tongue 21 and a draft part 23 to which the tongue 21 is connected. The main section 12 is supported for transport by wheels 26, 27, and 28 which are rotatably mounted on arms of a rock shaft 31 which is operated by a double-acting hydraulic jack 32 interposed between an arm of the rock shaft 31 and the frame 18. The wing section 13 is supported by a wheel 36 rotatably mounted on a leg of a rock shaft 37 which has an arm at its laterally inner end connected to an arm on the laterally inner end of rock shaft 31 by an adjustable link 38. As shown in FIG. 1, a pair of disc gangs 41, 42 are secured to the longitudinal parts 43, 44 of the frame 19 of wing section 13 and a pair of disc gangs 46, 47 are secured to longitudinal parts 48, 49 of the main frame 18. The illustrated implement is too wide to be moved through some gates and is too wide for transport on a single lane of most roads. In order to permit movement of the disc harrow from one field to another and over rural roads, where legally permissible, the wing section of the disc is folded about the longitudinal axis 14 fromm its normal, level working position, shown in FIGS. 1 and 2, to a folded up transport position as illustrated in FIG. 4. The means for accomplishing the folding and unfolding of the wing section 13 relative to the main section 12 includes a pair of double-acting hydraulic jacks 51, 52 disposed in transverse relation to axis 14. The jacks are aligned with and in juxtaposed relation to the legs 101, 102 of wing section frame 19. The jacks 51, 52 have cylinder components 53, 54 pivotally connected to the frame 19 of wing section 13 by longitudinally orientated pins 56, 57 and include rod components 61, 62 having identical pivot parts 63, 64 on their free ends, respectively. The pivot parts 63, 64 are pivotally and slidingly connected to pivot parts 66, 67 welded to the legs 103, 104 of the main frame 18 for pivotal and lost motion movement.

Referring also to FIGS. 5 and 6, pivot part 66 includes a pair of generally upright walls in the form of plates 71, 72 which have their bottom ends welded to the frame 18 and which extend upwardly a predetermined distance. The parallel, laterally extending upright plates 71, 72 include wall portions defining laterally extending slots 73, 74 which are spaced vertically above and laterally from the axis 14. The slots 73, 74 are aligned in the longitudinal direction and slope upwardly slightly in the direction toward the wing section 13; that is, they slope upwardly to the left as viewed in FIG. 5. The cooperating pivot part 63 on rod component 61 includes a pair of coaxial and oppositely extending cylindrical studs 76, 77 whose diameters are identical and slightly less than the vertical dimension or width of the slots 73, 74. The longitudinal extending studs 76, 77 slidingly engage the top and bottom surfaces defining the slots 73, 74, the latter permitting the wing section 13 to pivot about ten degrees up and ten degrees down from its level condition as shown in FIG. 2. As shown in FIG. 2, the jacks 51, 52 have been adjusted so that the longitudinal axis of the studs 76, 77 of the pivot part 63 is disposed approximately at the central part of the slots 73, 74. Thus the wing section 13 of the disc harrow is free to swing up and down as uneven ground is traversed during the discing operation. The stationary pivot part 66 on the main section 12 includes longitudinally extending braces 91, 92 which are welded at their longitudinally opposite ends to the upright plates 71, 72. The upright plates 71, 72 are further reinforced by a generally horizontal and longitudinally extending plate 94 which is welded at its longitudinally opposite ends to the inside of the plates 71, 72. The plate 94 serves as an abutment means to limit laterally inward shifting of the rod end of the jack as is more fully described hereinafter.

Referring to FIG. 3, the hydraulic jacks 51, 52 have been contracted to pivot the wing section 13 about the longitudinal pivot axis 14 to an overhead position wherein the center of gravity "c" of wing section 13 is vertically above the longitudinal pivot axis 14. In this position, the wing section is in a state of balance and the longitudinal axis 151 of jack 51 is substantially at right angles to the slots 73, 74. That is, the angle e is 90°. Thus there will be little, if any, tendency at this pivoted position of the wing section 13 for the pivot part 63 on the rod component 61 to move from its illustrated position in the end of the slots 73, 74 nearest the wing section 13. As the wing section 13 moves past its illustrated balanced condition in FIG. 3 to its foldup, transport position shown in FIG. 4, the jacks 51, 52 will continue to be contracted with the exhaust of fluid from the closed end of the cylinder components 53, 54 being assisted by the gravitational force of the wing section 13 acting on the jacks 51, 52. In order to ensure that the pivot parts 63, 64 on the rod components 61, 62 of the jacks 51, 52 do not move out of their illustrated positions in the ends of the slots 73, 74 adjacent the wing section 13, the abutments in the form of longitudinal plates 94, 94' are positioned sufficiently close to the upstanding rod components 61, 62 so as to prevent them from sliding laterally to the right as viewed in FIGS. 3 and 4. Thus the abutments 94, 94' prevent the pivot parts 63, 64 from moving to the laterally inner end of the slots when the jacks 51, 52 are transverse to the slots in pivot parts 66, 67. The abutments 94, 94' ensure that the pivot parts 63, 64 will stay in the ends of the slots 73, 74 nearest the wing section 13 as the latter is raised and lowered, thus avoiding sudden, jerking movement of the wing section 13 which would occur if the pivot parts 63, 64 slid to the other ends of the slots 73, 74.

When the wing section 13 has been folded up to its transport position, as illustrated in FIG. 4, the legs of the frame 19 will be in abutting engagement with an abutment surface 96 of the plate 72 and with an abutment surface 97 on the pivot part 67 at the front end of the main frame 18. Thus, the pivot parts 66, 67 also serve as stops or abutments for the wing section 13 in its transport position. It will be noted that in the working position of the wing section 13, as illustrated in FIG. 2, the pivot part 63 will be free to move longitudinally in the slots 73, 74 without abutment against the abutment plate 94.

Although the present invention is illustrated in a centerfold disc harrow, it should be understood that the invention may be used in 2 multiple-fold implement, such as a double-fold disc harrow wherein a wing section is mounted on each of the opposite lateral sides of a central main frame section.

The present invention provides an effective power foldup mechanism for a foldup implement wherein the pivot part on the main frame is so constructed that it is not necessary to install or remove pins in order to fold or unfold the implement or in order to provide a floating operation of a wing section. The stationary pivot part on the main frame serves as a stop for the folded wing section in its transport position. Also it will be noted that the abutment plates 94, 94' not only serve to prevent movement of the shiftable pivot part in the foldup condition of the wing section, but also serve as structural reinforcing members of the stationary pivot parts 66, 67, thus saving weight, materials and cost of manufacturing.

The embodiments of the invention in which an exclusive property or privilege is claimed are defined as follows:

1. A farm implement including a main section adapted for connection in draft relation to a tractor and a wing section pivotally connected to the main section at one lateral side of the latter for vertical swinging movement about a longitudinal axis between a lowered working position and a raised transport position, means for pivoting said wing section relative to said main section between said working and transport positions comprising:
   a double-acting hydraulic jack disposed in transverse relation to said longitudinal axis having cylinder and rod components,
   pivot means pivotally connecting one of said components to one of said sections at a point spaced from said longitudinal pivot axis, and
   a lost motion pivot connection between the other of said components and the other of said sections including
   a first pivot part fixedly secured to said other section at a position spaced laterally from said longitudinal pivot axis including an elongated slot with the elongated extent thereof extending generally laterally relative to said other section, said pivot part and said pivot means being disposed on laterally opposite sides of said longitudinal pivot axis when said wing section is in its lowered working position, and
   a second pivot part on said other component in cooperative engagement with said slot for movement from one extremity of said slot to the other, the longitudinal axis of said jack having a substantially right-angle relationship with said elongated extent of said slot when said wing section is raised by contraction of said jack to a position wherein the center of gravity of said wing section is in vertical alignment with said longitudinal axis, said pivot connection between said sections and said lost motion pivot connection permitting said wing section to swing downwardly about said longitudinal axis to a downwardly inclined angle relative to said main section.

2. The farm implement of claim 1 wherein said first pivot part abuts said one section when the said wing section is in its transport position.

3. The farm implement of claim 1 wherein said first pivot part includes an abutment preventing movement of said second pivot part from one end of said slot to the other when said axis of said jack is transverse to said slot.

4. The farm implement of claim 1 wherein said wing and main sections have frames including laterally extending and longitudinally spaced legs with their laterally inner ends pivotally interconnected on said longitudinal axis and wherein said jack is in juxtaposed relation to one of said legs on said frame of said one section.

5. The farm implement of claim 4 and further comprising a second double-acting hydraulic jack in juxtaposed relation to the other of said legs on said frame of said one section, said second jack having its opposite ends connected to said wing and main sections, respectively.

6. The farm implement of claim 1 wherein said first pivot part includes a pair of laterally extending upright walls presenting a pair of longitudinally aligned slots and wherein said second pivot part includes a pair of longitudinally aligned cylindrical studs cooperatively engaging said slots, respectively.

7. The farm implement of claim 6 wherein said first pivot part includes an abutment disposed above said slots operative to limit shifting of said second pivot part in said slot when said jack is disposed in a generally transverse relation to said slot.

8. The farm implement of claim 7 wherein said first pivot part abuts said one section when the latter is in its transport position.

9. The farm implement of claim 1 wherein said slot is spaced vertically above said longitudinal axis.

10. A farm implement including a main section adapted to connection in draft relation to a tractor and a wing section pivotally connected to the main section at one lateral side of the latter for vertical swinging movement about a longitudinal axis between a lowered working position and a raised transport position, means for pivoting said wing section relative to said main section between said working and transport positions comprising:
  a double-acting hydraulic jack disposed in transverse relation to said longitudinal axis having cylinder and rod components,
  pivot means pivotally connecting one of said components to one of said sections at a point spaced from said longitudinal pivot axis, and
  a lost motion pivot connection between the other of said components and the other of said sections including
    a first pivot part fixedly secured to said other section at a position spaced laterally from said longitudinal pivot axis including an elongated slot with the elongated extent thereof extending generally laterally relative to said other section, said pivot part and said pivot means being disposed on laterally opposite sides of said longitudinal pivot axis when said wing section is in its lowered working position,
    a second pivot part on said other component in cooperative engagement with said slot for movement from one extremity of said slot to the other when said wing section is in its lowered working position, and
    abutment means on said other section confining said second pivot part to a position at one end of said slot by abutting against said other component should said second pivot part move a predetermined distance away from said one end of said slot toward the other end of said slot when said axis of said jack is generally transverse to said elongated extent of said slot.

11. The farm implement of claim 10 wherein said first pivot part includes a pair of upright walls extending in transverse relation to said longitudinal axis and presenting a pair of longitudinally aligned slots and wherein said second pivot part includes a pair of longitudinally aligned cylindrical studs cooperatively engaging said slots, respectively.

12. The farm implement of claim 11 wherein said abutment means is secured to first pivot part and is disposed above said slots.

13. The farm implement of claim 12 wherein said abutment means is rigidly secured to the top ends of said pair of upright walls.

* * * * *